(12) United States Patent
Asatani

(10) Patent No.: US 9,197,862 B2
(45) Date of Patent: Nov. 24, 2015

(54) CONTACT STATE ESTIMATING APPARATUS

(71) Applicant: HONDA MOTOR CO., LTD., Tokyo (JP)

(72) Inventor: Minami Asatani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 318 days.

(21) Appl. No.: 13/778,861

(22) Filed: Feb. 27, 2013

(65) Prior Publication Data
US 2013/0258100 A1    Oct. 3, 2013

(30) Foreign Application Priority Data

Mar. 30, 2012  (JP) .................................. 2012-082013

(51) Int. Cl.
H04N 7/18      (2006.01)
G01C 3/08      (2006.01)
G01S 17/08     (2006.01)
G01S 17/87     (2006.01)
(Continued)

(52) U.S. Cl.
CPC .. *H04N 7/18* (2013.01); *G01C 3/08* (2013.01); *G01S 7/4808* (2013.01); *G01S 17/08* (2013.01); *G01S 17/875* (2013.01); *G01S 17/88* (2013.01); *G01S 17/89* (2013.01); *G06K 9/6206* (2013.01)

(58) Field of Classification Search
CPC ............ H04N 7/18; G01C 3/08; G01S 17/08; G01S 17/875; G01S 17/89; G01S 7/4808; G01S 17/88; G06K 9/6206

USPC ......................................... 348/140; 901/47, 1
See application file for complete search history.

(56) References Cited

U.S. PATENT DOCUMENTS 6,317,652 B1 * 11/2001 Osada ........................... 700/245
2004/0013295 A1 * 1/2004 Sabe et al. .................... 382/153
(Continued)

FOREIGN PATENT DOCUMENTS

JP          09-005050         1/1997

OTHER PUBLICATIONS

"Curved Surface Contact Patches with Quantified Uncertainty", Marsette Vona and Dimitrios Kanoulas, 2011 IEEE/RSJ International Conference on Intelligent Robots and Systems, pp. 1439-1446.

Primary Examiner — Tung Vo
Assistant Examiner — Zaihan Jiang
(74) Attorney, Agent, or Firm — Rankin, Hill & Clark LLP

(57) ABSTRACT

A position and a posture of a virtual face is searched so that a total cost E of a first cost $E_1$ and a second cost $E_2$ is approximated to a smallest value or a minimum value. A first cost $E_1(e_1)$ corresponds to a sum of elastic energy with a first deviation $e_1(s)$ as a deformation amount, of a virtual spring group having a value of a first coefficient function $w_1(e_1(s))$ in a target region of a standard image as a spring coefficient. A second cost $E_2(e_1, e_2)$ corresponds to a sum of elastic energy with a second deviation $e_2$ as a deformation amount, of a virtual spring group having a value of a second coefficient function $w_2(e_2(s))$ of each pixel s included in the target region of the standard image as a spring coefficient.

9 Claims, 16 Drawing Sheets

(51) Int. Cl.
  *G01S 17/88* (2006.01)
  *G01S 17/89* (2006.01)
  *G01S 7/48* (2006.01)
  *G06K 9/62* (2006.01)

(56) References Cited

U.S. PATENT DOCUMENTS

| | | | |
|---|---|---|---|
| 2004/0233290 A1* | 11/2004 | Ohashi et al. | 348/187 |
| 2005/0075755 A1* | 4/2005 | Takenaka et al. | 700/245 |
| 2005/0113973 A1* | 5/2005 | Endo et al. | 700/245 |
| 2005/0131581 A1* | 6/2005 | Sabe et al. | 700/245 |
| 2006/0025888 A1* | 2/2006 | Gutmann et al. | 700/245 |
| 2006/0138988 A1* | 6/2006 | Kaneko et al. | 318/560 |
| 2009/0148036 A1* | 6/2009 | Aoyama | 382/154 |
| 2010/0126785 A1* | 5/2010 | Shimada | 180/8.1 |
| 2010/0138043 A1* | 6/2010 | Kajima | 700/261 |
| 2010/0324769 A1* | 12/2010 | Takaoka | 701/25 |
| 2012/0232696 A1* | 9/2012 | Tang | 700/258 |

* cited by examiner

FIG.5
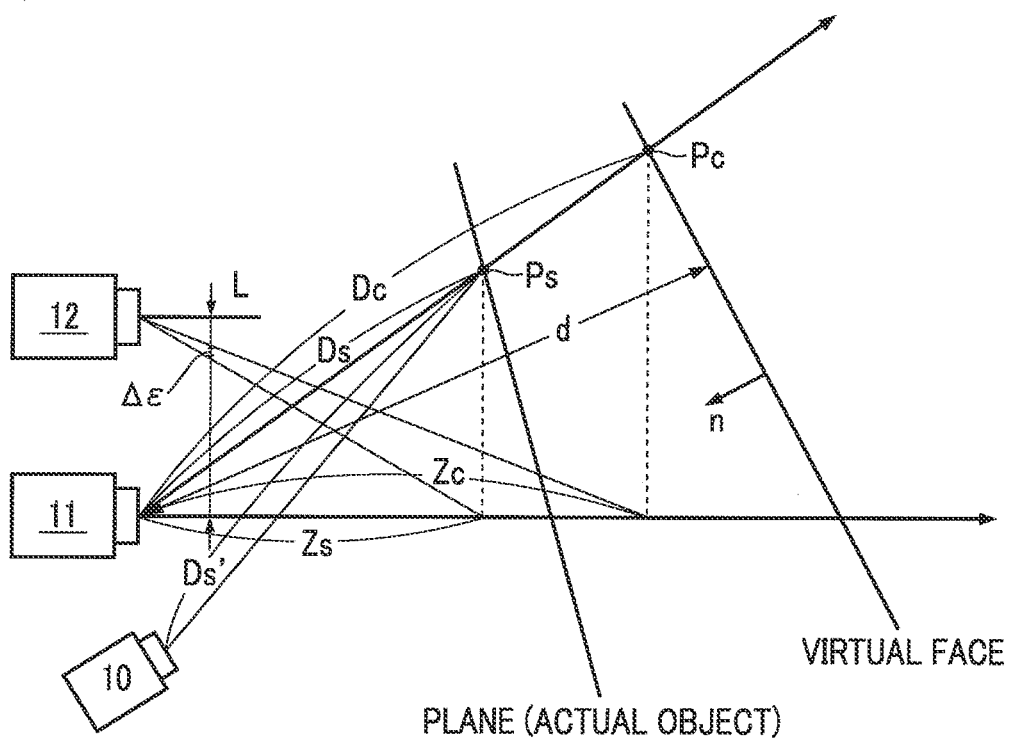
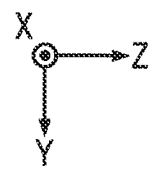

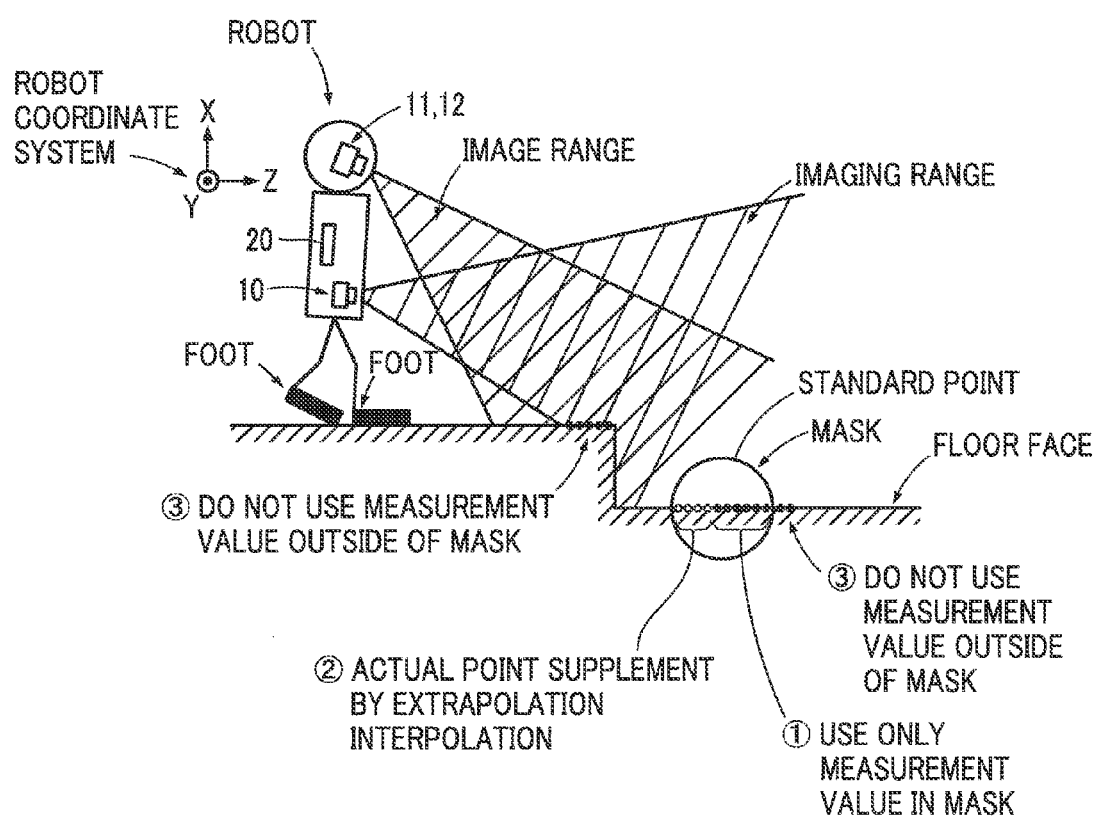

● ⋯ACTUAL POINT (WITH MEASUREMENT VALUE)
○ ⋯ACTUAL POINT (SUPPLEMENTED)

CONTACT STATE ESTIMATING APPARATUS

BACKGROUND OF THE INVENTION

1. Field of the Invention

The present invention relates to an apparatus that estimates a distance or the like to a subject by using a range image sensor and two or more image sensors.

2. Description of the Related Art

There is proposed a method of obtaining a three-dimensional image by combining a distance image obtained through a range image sensor and a distance image obtained through each of a stereo camera (see Japanese Patent Application Laid-Open No. H09-005050).

There is proposed a method of generating a space map for a legged mobile robot by approximating each of a plurality of scattered local regions of a floor face by one type of patch among a plurality of types of known shaped patches (generating a patch map), and collecting the patch map (see "Curved Surface Contact Patches with Quantified Uncertainty", Marsette Vona and Dimitrios Kanoulas, 2011 IEEE/RSJ International Conference on Intelligent Robots and Systems, Pages: 1439-1446).

SUMMARY OF THE INVENTION

Problems to be Solved by the Invention

However, since a contact state between a foot and the ground immediately after the floating foot from the ground comes into contact with the ground is not estimated, there is a possibility that it is difficult to control a posture of a robot stably in some grounding states after the foot actually comes into contact with the ground.

Thus, it is an object of the present invention to provide an apparatus capable of precisely estimating a future contact state between different objects such as a foot of a legged mobile robot and a floor face.

Solution to Solve the Problem

The present invention relates to a contact state estimating apparatus and a method for estimating a contact state between a surface of an actual object and a virtual face which is a surface of a virtual object having a designated shape by using a pair of image sensors configured to acquire each of a pair of images composed of a plurality of pixels having a designated physical quantity as a pixel value by imaging the actual object, and a range image sensor configured to measure a distance up to the actual object and to allocate the measured distance with respect to each of a plurality of pixels composing a target region of one of the images obtained by one of the image sensors among the pair of image sensors.

The contact state estimating apparatus of the present invention comprises: a first processing element configured to calculate a sum of a value of a first cost function, having a first deviation allocated to each pixel in the target region as a main variable, as a first cost; a second processing element configured to calculate a sum of a value of a second cost function, having a second deviation allocated to each pixel in the target region or both of the first deviation and the second deviation as a main variable, as a second cost; and a third processing element configured to search for a position and a posture of the virtual face in a case of contacting the surface of the actual object so as to approximate a total cost of the first cost and the second cost to a smallest value or a minimum value.

"The first deviation" is defined as a variable such that a magnitude of an absolute value is determined according to a length of an interval between an actual point whose position is determined by a distance to the actual object obtained by the range image sensor and a virtual point which is a result of projecting the actual point to the virtual face in a line of sight direction of the one of the image sensors, and being a positive value in a case where the virtual point is positioned farther than the actual point with reference to the one of the image sensors, while being a negative value in a case where the virtual point is positioned nearer than the actual point with reference to the one of the image sensors. "The second deviation" is defined as a variable such that a magnitude is determined according to a magnitude of a difference between the designated physical quantity possessed by the pixels of the one of the images and the designated physical quantity possessed by the pixels of the other image obtained by the other image sensor corresponding to the pixels of the one of the images in a form according to the position and the posture of the virtual face.

Each of "the first cost function" and "the second cost function" is defined as a function which shows a smallest value or a minimum value in a case where a value of the main variable is 0 and which is an increasing function in a positive definition domain.

According to the contact state estimating apparatus of the present invention, in a case where a state of at least a part of the virtual object enters into the actual object is set, the first deviation becomes a positive value. Therefore, as the virtual point is at a deeper location inside and away from the surface of the actual object according to this setting, the first cost or both of the first and the second cost is evaluated higher, and the total cost is also evaluated higher.

Accordingly, by searching the position and the posture of the virtual face so as to enable to approximate the total cost to the smallest value or the minimum value, it can be estimated that the position and the posture of the virtual face determined by a virtual point group in which all of the virtual point is not inside the actual object, and in which the virtual points are positioned on the surface of the actual object is the contact state of the virtual face with respect to the actual object.

Thereby a situation of an infeasible state, where a common real space is occupied at the same time by each of one actual object which is the imaging target and other actual object corresponding to the virtual object, being searched as a contact state of the two actual objects can be surely avoided. The other actual object corresponding to the virtual object means an actual object having a surface of a same shape and size with the virtual face or an actual object capable of adaptively forming the surface. Further, a future contact state of the virtual object with respect to the actual object can be estimated precisely.

According to the contact state estimating apparatus of the present invention, it is preferable that the first cost function is defined by a product between a positive exponentiation of an absolute value of the first deviation and a first coefficient function being a function having the first deviation as the main variable and a range of value being 0 or more and a value in a positive definition domain being larger than a value in a negative definition domain even in a case where absolute values thereof are same, and the second cost function is defined by a product between a positive exponentiation of an absolute value of the second deviation and a second coefficient function being a function having the first deviation or the second deviation as the main variable and a range of value being 0 or more and a value in the positive definition domain being larger than a value in the negative definition domain even in a case where absolute values thereof are same.

According to the thus configured contact state estimating apparatus, the first and the second coefficient functions are defined so as to calculate one of or both of the first and the second costs according to one of or both of the first and the second cost functions which are asymmetric in the positive and negative definition domains. The first cost corresponds to a total of elastic energy, in which the first deviation being a deformation amount, of a virtual spring group having a value of the first coefficient function in each pixel included in the target region of one of the images as a spring coefficient. Similarly, the second cost corresponds to a total of elastic energy, in which the second deviation being a deformation amount, of a virtual spring group having a value of the second coefficient function in each pixel included in the target region of one of the images as a spring coefficient.

Therefore, the position and posture of the virtual face can be searched in a form of giving priority to bring the virtual point located inside the actual object closer to the surface of the actual object rather than to bring the virtual point located outside the actual object closer to the surface of the actual object. Thereby a situation of an infeasible state, where a common real space is occupied at the same time by each of actual object which is the imaging target and other actual object corresponding to the virtual object, being searched as a contact state of the two actual objects can be surely avoided. Further, a future contact state of the virtual object with respect to the actual object can be estimated precisely.

According to the contact state estimating apparatus of the present invention, it is preferable that one or both of the first and the second coefficient functions is defined as an increasing function at least in the positive definition domain.

According to the thus configured contact state estimating apparatus, the value of the spring coefficient of the virtual spring becomes a larger value as the deformation amount of the spring is larger. Therefore, as the virtual point is at a deeper location inside and away from the surface of the actual object according to the setting of the position and posture of the virtual face, the first cost or both of the first and the second cost corresponding to the elastic energy of the virtual spring is evaluated even higher, and the total cost is also evaluated higher.

As a result, it is able to search the position and posture of the virtual face so as to approximate the virtual point located inside the actual object to the surface of the actual object faster or stronger. Further, a future contact state of the virtual object with respect to the actual object can be estimated precisely and at a high speed.

According to the contact state estimating apparatus of the present invention, it is preferable that one or both of the first and the second coefficient functions being defined as a function which is 0 in the negative definition domain or a definition domain less than a negative designated value.

According to the thus configured contact state estimating apparatus, the cost of the virtual point outside the actual object or the virtual point which is away from the surface of the actual object to some extent is uniformly estimated as "0". Thereby, the calculation load required for searching processing of a combination of coordinate values of virtual points that brings the total cost closer to the smallest value or the minimum value can be reduced.

According to the contact state estimating apparatus of the present invention, the second deviation as the main variable of the second coefficient function may be defined as a parallax residual of the pair of image sensors as a result of the difference of the designated physical quantity imaged by each of the pair of image sensors being converted, according to a restraint condition that the designated physical quantity of a same part in the real space are same, or defined as a distance residual corresponding to the parallax residual.

According to the contact state estimating apparatus of the present invention, the range image sensor may be configured to obtain a distance image composed of a plurality of pixels having a distance to the actual object as a pixel value, and the first processing element is configured to allocate a distance according to the pixel value of each pixel composing the distance image as a pixel value with respect to the plurality of pixels composing the target region of the one of the images, according to a relative arrangement relation of the one of the image sensors and the range image sensor.

According to the contact state estimating apparatus of the present invention, it is preferable that one or both of the first and the second coefficient functions being defined as a function which is a positive designated value in the negative definition domain or a definition domain less than a negative designated value.

According to the contact state estimating apparatus of the present invention, it is preferable that the first processing element determines a standard point in a region where the target region is projected to the surface of the virtual object, selects an actual point within a predetermined range from the standard point or an actual point corresponding to the standard point, and determines the first deviation.

BRIEF DESCRIPTION OF THE DRAWINGS

FIG. 5 is an explanatory view related to an actual point, a virtual face, and a virtual point.

FIG. 12 is an explanatory view of a function of the contact state estimating apparatus of the present invention using a mask.

DESCRIPTION OF THE PREFERRED EMBODIMENTS

Figure 1:
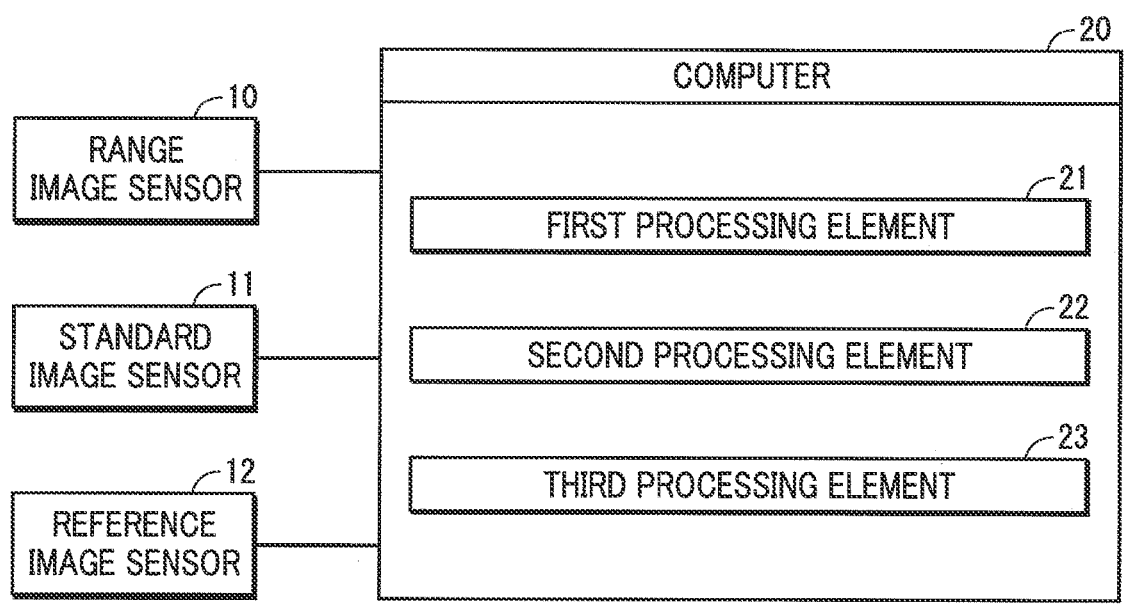
FIG. 1 is an explanatory view of a configuration of a contact state estimating apparatus as one embodiment of the present invention.
Figure 2:
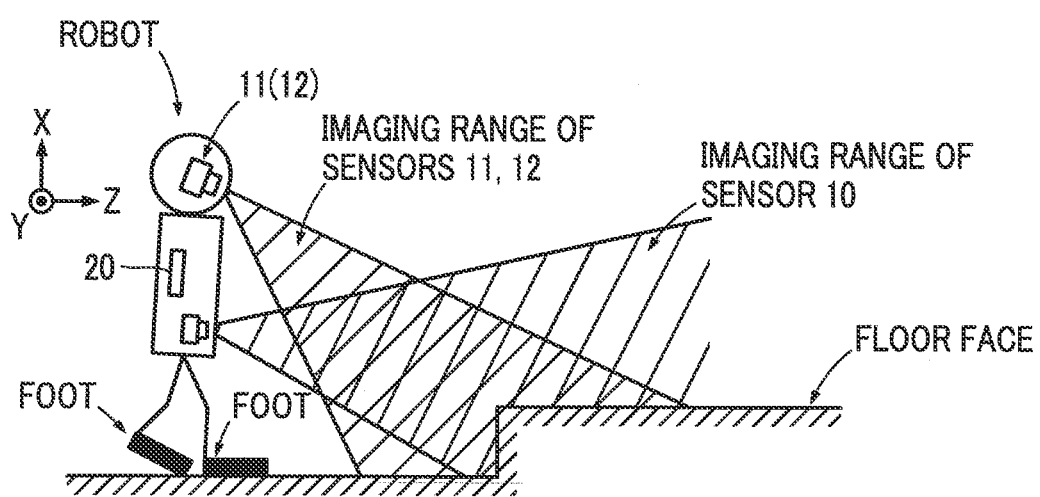
FIG. 2 is an explanatory view related to an aspect of usage of the contact state estimating apparatus of the present invention.

First Embodiment of the Present Invention (Configuration) A contact state estimating apparatus illustrated in FIG. 1 includes a range image sensor 10, a standard image sensor 11, a reference image sensor 12, and a computer 20. The standard image sensor 11 and the reference image sensor 12 configures "a pair of (or left-and-right pair of) image sensors". The standard image sensor 11 configures "one of the image sensors" and the reference image sensor 12 configures "the other image sensor". The contact state estimating apparatus, for instance, is mounted on a legged mobile robot R as illustrated in FIG. 2, and is used for estimation of a contact state between a part of legs such as a foot or the like and a floor face.

The contact state estimating apparatus may comprise as its element, three or more image sensors which are able to obtain an image having a same designated physical quantity as a pixel value, and the computer 20 may be configured to select two among the three or more image sensors as the pair of image sensors.

As the configuration of the legged mobile robot, the configuration proposed by the present applicant in Japanese Patent No. 3674788, or the like can be adopted. Furthermore, the contact state estimating apparatus may be used to estimate a contact state between a palm of a robot arm or a part of the arm and a target object. Moreover, the contact state estimating apparatus may be installed in a vehicle and be used for estimation of a contact state between a tire of the vehicle and a road face.

The range image sensor 10 is, for example, a Time-of-Flight (TOF) range image sensor, and obtains a primary distance image in which each pixel having a distance measurement value $Ds'$ (refer to FIG. 4) as the pixel value. "A primary distance image coordinate system" is defined by an imaging elements group arranged on an imaging area or a plane of the range image sensor 10.

The standard image sensor 11 is one of the cameras (for example, the right side camera) of a visible light stereo camera, and obtains a standard image in which each pixel at least has a luminance (designated physical quantity) as the pixel value. An optical axis direction of the standard image sensor 11 is defined as a Z axis direction (refer to FIG. 4). "A standard image coordinate system" is defined by an imaging elements group arranged on an imaging area or a plane of the standard image sensor 11. A lateral direction of the standard image coordinate system is defined as an X axis direction, and a vertical direction is defined as a Y axis direction.

The reference image sensor 12 is the other camera (for example, the left side camera) of the visible light stereo camera, and obtains a reference image in which each pixel at least has a luminance as the pixel value similar to the standard image. "A reference image coordinate system" is defined by an imaging elements group arranged on an imaging area or a plane of the reference image sensor 12.

Camera parameters (inside parameter and outside parameter) of each of the range image sensor 10, the standard image sensor 11, and the reference image sensor 12 are known and stored in a memory of the computer 20 composing the contact state estimating apparatus. For example, a rotational matrix, a translational matrix, or a quaternion equivalent thereto expressing a coordinate transformation between the primary distance image coordinate system and the standard image coordinate system are stored in the memory. Similarly, a rotation matrix, a translation matrix, or a quaternion equivalent thereto expressing a coordinate transformation between the standard image coordinate system and the reference image coordinate system are stored in the memory.

In a case where the contact state estimating apparatus is mounted on a robot, a position and posture of each of the primary distance image coordinate system, the standard image coordinate system, and the reference image coordinate system with respect to a robot coordinate system is calculated according to a forward kinematics model expressing a behavior of the robot, and then stored in the memory.

In the robot coordinate system, a center of mass (for example, included in a body) of the robot is defined as an origin, an upward of the robot is defined as +x direction, a right direction is defined as +y direction, and a forward direction is defined as +z direction. A position and posture of the robot coordinate system in a world coordinate system are, for example, defined by an action plan of the robot.

The programmable computer 20 composing the contact state estimating apparatus includes a first processing element 21 which is configured to execute arithmetic processing described later having image signals from each of the range image sensor 10, the standard image sensor 11, and the reference image sensor 12 as a processing target, a second processing element 22, and a third processing element 23. A single processor (an arithmetic processing unit) may function as these three arithmetic processing elements 21 to 23, or a plurality of processors may function as these three arithmetic processing elements 21 to 23 in a coordinated fashion through mutual communication.

Each arithmetic processing element being "configured" to execute arithmetic processing in charge means "programmed" so that an arithmetic processing unit such as a CPU composing each arithmetic processing element reads software in addition to necessary information from a memory such as ROM, RAM, or the like, or a recording medium and executes the arithmetic processing to the information in accordance with the software.

(Functions)

The following describes a contact state estimating method executed by the thus configured contact state estimating apparatus. In the present embodiment, a contact state of a future rear face (a virtual face) of a foot of the robot and a floor face (actual object surface) is estimated. In addition, in a case where the robot has a hand at the end of the arm, a contact state of the palm face of the hand or a surface of a finger portion and the actual object such as a cup or the like which is an object of a task to be executed by the robot, may be estimated.

Figure 3:
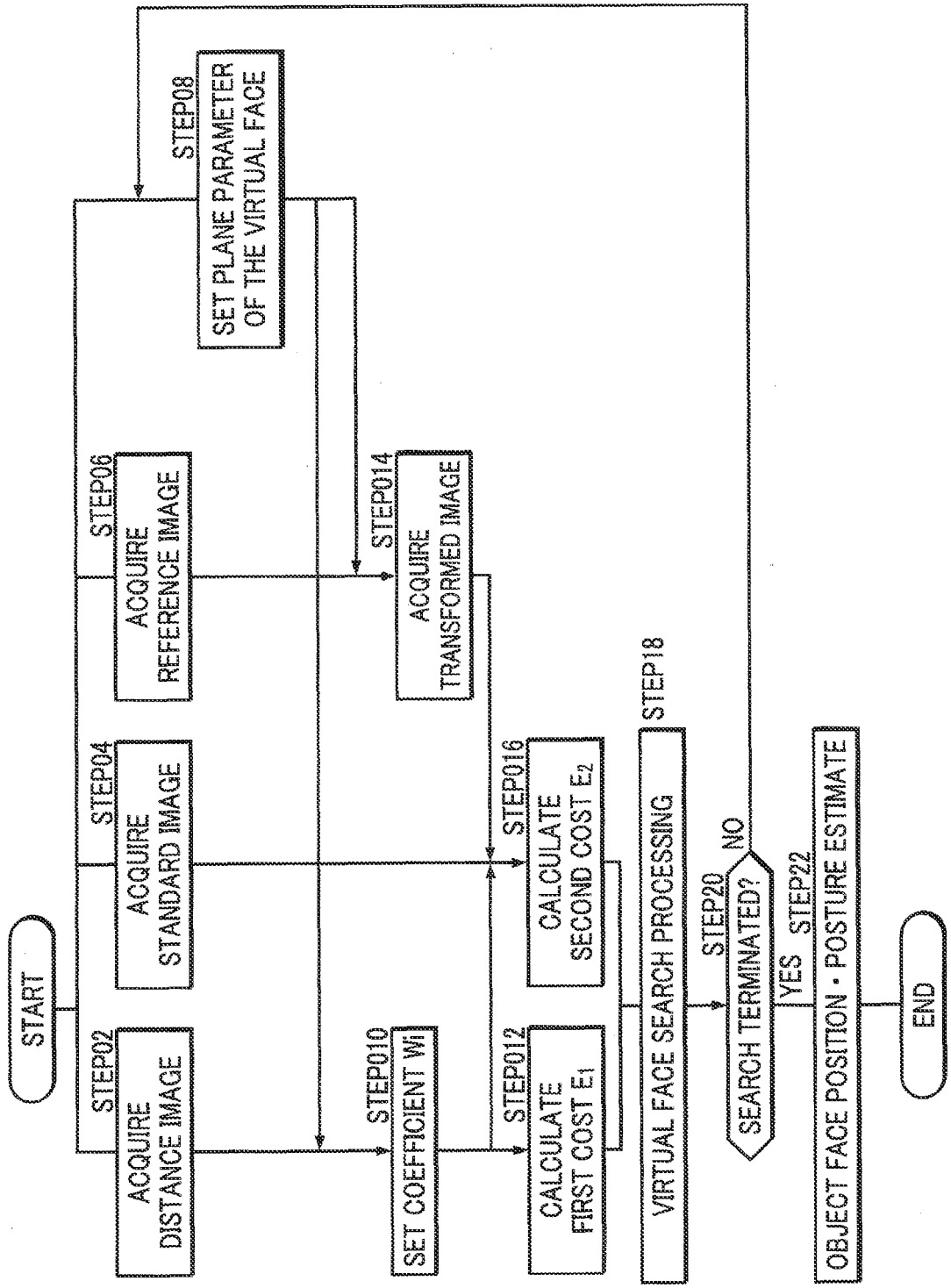
FIG. 3 is an explanatory view of a function of the contact state estimating apparatus of the present invention.

"A secondary distance image" composed of a plurality of pixels having a measurement value Ds (s) by the range image sensor 10 as the pixel value is acquired (FIG. 3/STEP02). "s" means a pixel position (a position of a quantized point) included in a region of interest (ROI) which is the target region in the standard image, and allocated with the distance measurement value Ds, among pixel positions in the standard image coordinate system, to be precise, it means a coordinate value thereof.

In particular, "the primary distance image (distance image)" is acquired through the range image sensor 10. The plurality of pixels s" composing the primary distance image (refer to FIG. 4) are allocated with the distance measurement value Ds' to the subject to be imaged (refer to FIG. 5) as the pixel value.

Figure 4:
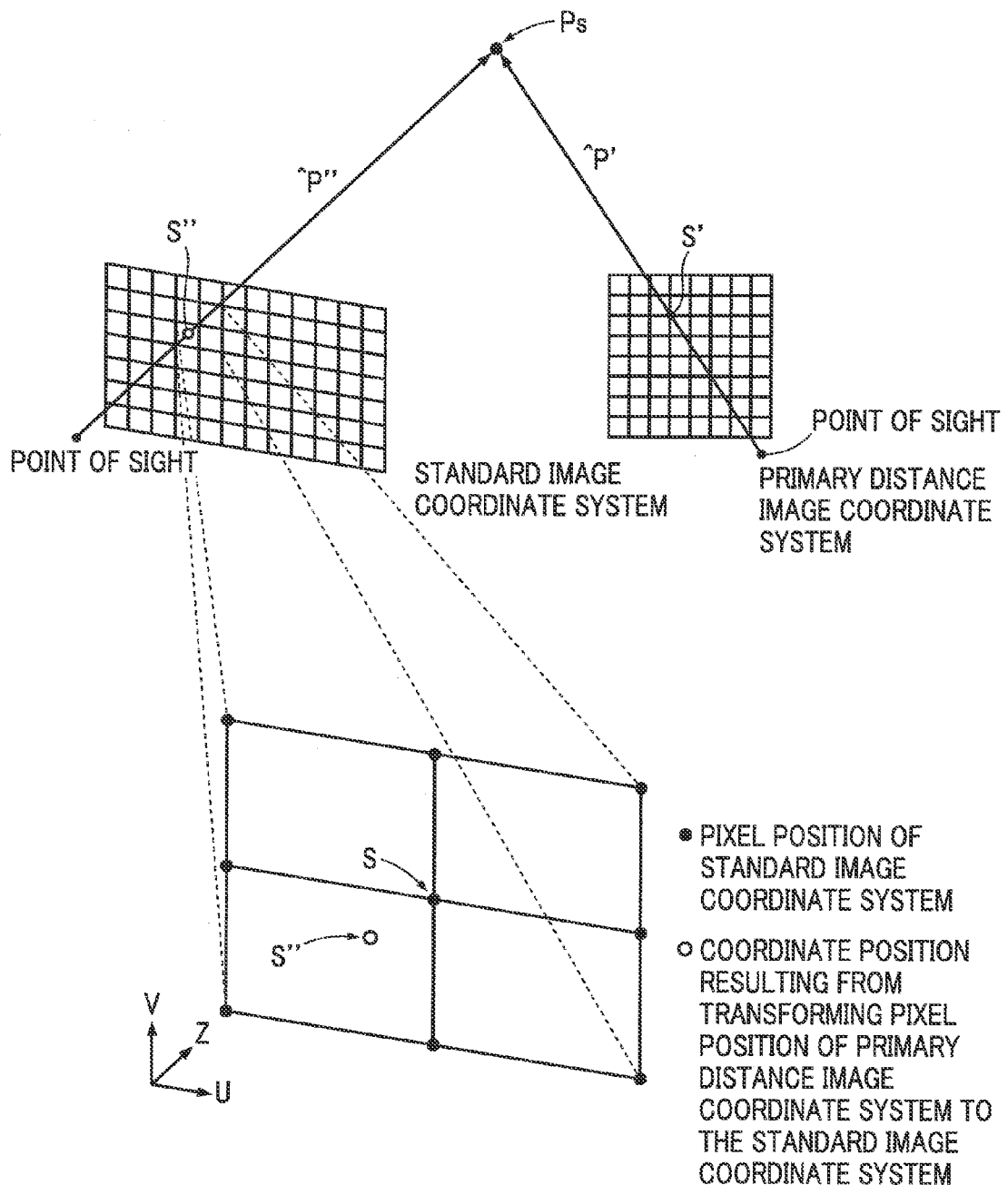
FIG. 4 is an explanatory view related to a correlative relationship of a standard image coordinate system and a distance image coordinate system.

Next, point position s" which is a result of coordinate transformation of pixel position s' of the primary distance image coordinate system to the standard image coordinate system, is acquired (refer to FIG. 4). The position of an observation point Ps based on the primary distance image coordinate system is expressed by vector $\hat{p}'=Ds'\hat{e}'(s')$. $\hat{}$ means a vector (the same applies hereinafter). $\hat{e}'(s')$ is an unit vector indicating a line of sight direction of the range image sensor 10 which passes the pixel position s' of the primary distance coordinate system.

Based on the rotational matrix R and the translational matrix T expressing the coordinate transformation of the primary distance image coordinate system to the standard image coordinate system, a vector $\hat{p}''=R\hat{p}'+T$ which expresses a position of the observation point Ps based on the standard image coordinate system is calculated. The rotational matrix R and the translational matrix T are stored in the memory in advance. The rotational matrix R and the translational matrix T may be defined by a quaternion which is mathematically equivalent thereto.

Based on Zs" which is the vector $\hat{p}''$ and a depth direction component thereof (a component in the Z direction perpendicular with respect to the standard image coordinate system which is an X-Y coordinate system), coordinate position s"=(1/Zs")$\hat{p}''$ which corresponds to the observation point Ps in the standard image coordinate system is obtained.

The coordinate position s" (refer to the white circle of FIG. 4) in the standard image coordinate system does not generally coincide with the pixel position s (refer to the black circle of FIG. 4). Therefore, a distance (actual point distance) Zs determined based on distance Zs" corresponding to the coordinate position s" is allocated with respect to each pixel position s of the standard image coordinate system according to known interpolation methods such as a nearest neighbor interpolation method, bilinear interpolation method, or bicubic spline method, or the like.

Then, norm Ds(s) of a vector $\hat{p}=Ds\hat{e}(s)$ expressing the position of the observation point Ps based on the secondary distance image coordinate system is allocated as the pixel value with respect to each pixel position s of the standard image coordinate system. $\hat{e}(s)$ is a unit vector indicating a line of sight direction toward the observation point Ps which passes the pixel position s of the secondary distance image coordinate system.

However, taking into account of the difference or the like of each of the resolution of the range image sensor 10 and the standard image sensor 11, it is not necessary to allocate the distance measurement value to all of the pixel position of the standard image coordinate. By this, the secondary distance image is acquired.

Furthermore, "a standard image" composed of a plurality of pixels having at least the luminance (designated physical quantity) as the pixel value is acquired through the standard image sensor 11 (FIG. 3/STEP04).

Moreover, "a reference image" composed of a plurality of pixels having at least the luminance as the pixel value similar to the standard image is acquired through the reference image sensor 12 (FIG. 3/STEP06).

A sequence of processing explained next is executed with respect to the secondary distance image, the standard image, and the reference image of the same time which were acquired at the same time and stored in the memory. Here, in a case the range image sensor 10, the standard image sensor 11, and the reference image sensor 12 are not completely synchronized, the secondary distance image, the standard image, and the reference image of the same time may be acquired at the each of the slightly different or approximately the same time.

First, the foot rear face (the surface of the virtual object) of the robot for the pixel position s of the standard image coordinate system is set as the "virtual face" (FIG. 3/STEP08). Particularly, by setting a standard position (vector) $\hat{q}_i$ of an i-th virtual point on the virtual face, a standard position and a standard posture of the foot rear face in a standard coordinate system are set. In a case where the foot rear face is a planner shape, the standard position $\hat{q}_i$ is defined by expression (001).

$$\hat{q}_i = {}^t(x_i, y_i, 1) \tag{001}$$

Here, $^t$ denotes transposition. $(x_i, y_i)$ denotes a pixel position having distance measurement value $z_i$ as the pixel value in the secondary distance image coordinate system. An area and a shape of the range defined by standard position group $Q=(\hat{q}_1, \ldots \hat{q}_i, \ldots \hat{q}_n)$ is determined unambiguously according to the distance in addition to an area and a shape of the foot rear face stored in the storage unit.

On the other hand, the standard position and the standard posture of the foot rear face can be arbitrarily changed. For example, by uniformly adding or subtracting a given value to or from an x component of the standard position $\hat{q}_i$, the standard position of the foot rear face in the standard coordinate system may be changed to the extent of the given value in the x direction. Furthermore, by uniformly multiplying factor cos θ or sin θ expressing a rotation about the z axis for a given angle θ to each of the x component and the y component of the standard position ˆ$q_i$, the standard posture in the xy plane of the foot rear face in the standard coordinate system can be changed.

In addition, a plane parameter ˆm(s)=$^t$($m_1$, $m_2$, $m_3$) expressing the position and the posture of the foot rear face in the standard coordinate system is set. The initial value of the plane parameter ˆm(s) may be arbitrary, however, as will be described later, a current value of the plane parameter ˆm(s) is set by correcting a previous value.

A three-dimensional orthogonal coordinate system having a direction orthogonal with respect to the secondary distance image coordinate system (two dimensional) as the z direction is adopted as the standard coordinate system (refer to FIG. 5). Since a distance Ds between an optical center of the standard image sensor 11 and the surface of the object is acquired (refer to FIG. 3/STEP02 and FIG. 5), a pixel value Zs (z component) of the pixel at the position having an angle φ with respect to the optical axis in the distance image is defined as Ds cos φ. Therefore, in a case where the range image sensor 10 is calibrated, the z component Zs(s) is calculated according to this definition.

As the standard coordinate system, the robot coordinate system or the world coordinate system may be used. For instance, when the range image sensor 10 is mounted on the robot, the position and the posture of the distance image coordinate system with respect to the robot coordinate system is calculated in accordance with a forward kinematic model representing the behavior of the robot, and then stored in the storage device. The position and posture of the distance image coordinate system with reference to the robot coordinate system is defined by a translational matrix and a rotational matrix or a quaternion equivalent thereto.

In the robot coordinate system, the mass center (e.g., included in a body) of the robot is defined as the origin, the upward of the robot is defined as +x direction, the right direction is defined as +y direction, and the forward is defined as +z direction (refer to FIG. 2). The position and posture of the robot coordinate system in the world coordinate system is, for example, defined by the action plan of the robot stored in the storage device.

A coordinate value in the three-dimensional orthogonal coordinate system with reference to the secondary distance image coordinate system undergoes coordinate transformation using the matrix stored in the storage device, whereby a coordinate value in the robot coordinate system can be calculated. A coordinate value in the three-dimensional orthogonal coordinate system with reference to the secondary distance image coordinate system undergoes coordinate transformation using the matrix and the action plan stored in the storage device, whereby a coordinate value in the world coordinate system can be calculated.

The plane parameter ˆm is defined according to expression (002) based on the shape Q of the foot rear face, actual point coordinate values group Z=$^t$($z_1$, ..., $z_i$, ... $z_n$), and n-th unit matrix I.

$$m=(Q^TQ)^{-1}QIZ \quad (002)$$

Then, each component of vector ˆZ calculated according to expression (003) is assumed as i-th virtual point coordinate value Pc(s) (to be precise, the z component Zc(s) thereof) (refer to FIG. 5).

$$\hat{Z}=^tQm \quad (003).$$

The surface shape of the virtual object can be changed to a plane as well as a curved face in any shape by a user of the apparatus of the present invention. For instance, a curved face parameter m=$^t$($m_{11}$, $m_{12}$, $m_{21}$, $m_{22}$, $m_3$) is set, whereby the shape of the virtual object may be set so as to have a curved face represented by the expression (022) as the surface thereof:

$$m_{11}x^2+m_{12}x+m_{y,1}y^2+m_{22}y+m_3z=\alpha \quad (022)$$

In this case, for instance, a contact state between a palm whose surface shape is represented by the curved face parameter or the expression (022) and an object such as a handrail can be estimated.

The first processing element 21 calculates a first coefficient $w_1$(s) in accordance with a first coefficient function $w_1(e_1)$ based on a first deviation $e_1$(s) determined according to the width of an interval |Ds(s)−Dc(s)| between the actual point Ps(s) and the virtual point Pc(s) (refer to FIG. 3/STEP12).

For example, distance residual |Zs(s)−Zc(s)| between an actual point distance Zs(s) and a virtual point distance Zc(s) is used as the first deviation $e_1$(s) (refer to FIG. 5).

"Actual point" means point Ps(s)=Zsˆs, the real space position of which is determined according to the pixel value Ds(s) of the pixel position s=(u, v) in the secondary distance image coordinate system (corresponding to the target region which is a part of the standard image coordinate system) (refer to FIG. 5). ˆs=(u, v, 1) is a vector expressing the position of s. Moreover, "virtual point" means a point where the actual point Ps(s) is projected on the virtual face in the line of sight direction of the standard image sensor 11 (refer to FIG. 5).

Various distances defined unambiguously from a geometrical relation according to the size of the distance residual |Ds(s)−Dc(s)| may be used as the first deviation $e_1$(s). For instance, instead of the interval |Ds(s)−Dc(s)| itself, an interval between a point as a result of projecting the actual point Ps(s) to the virtual face in the Z direction and the virtual point Pc(s) in a designated direction may be used as the first deviation $e_1$(s). Moreover, an interval between a point as a result of projecting the virtual point Pc(s) on a plane corresponding to the object to be imaged in the z direction and the actual point Ps(s) in the designated direction may be used as the first deviation $e_1$(s).

Figure 6A:
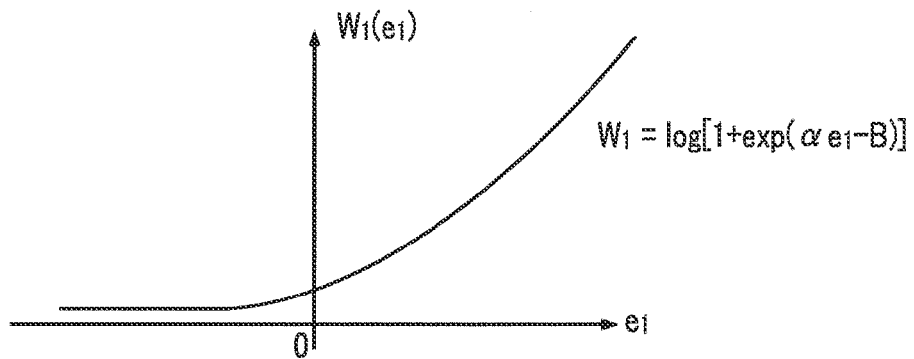
FIG. 6A is an explanatory view related to a first embodiment of a coefficient function.

The first coefficient $w_1(e_1(s))$ is calculated according to the first coefficient function (dependent variable) $w_1(e_1)$ defined by expression (101) having the first deviation $e_1$ as the main variable. This first coefficient function $w_1(e_1)$ is an increasing function of the first deviation $e_1$ as shown in FIG. 6A. This first coefficient function $w_1(e_1)$ has a value range of 0 or more and less than a positive designated value $\epsilon_1$ in the negative definition domain ($e_1$<0), while has a value range of a positive designated value $\epsilon_1$ or more in the definition domain of 0 or more ($e_1$≥0).

$$w_1(e_1)=\log(1+\exp(\alpha e_1-\beta)), (\alpha>0,\beta>0) \quad (101)$$

Figure 6B:
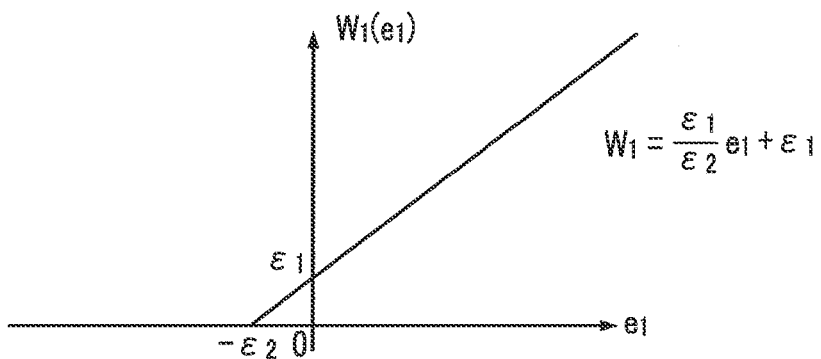
FIG. 6B is an explanatory view related to a second embodiment of the coefficient function.

The first coefficient $w_1(e_1(s))$ may be calculated according to the first coefficient function $w_1(e_1)$ defined by expression (102). This first coefficient function $w_1(e_1)$ has a value range of 0 or more and less than a positive designated value $\epsilon_1$ in the negative definition domain, while has a value range of a positive designated value $\epsilon_1$ or more in the definition domain of 0 or more as is shown in FIG. 6B. This first coefficient function $w_1(e_1)$ is 0 in a definition domain equal to or less than a negative designated value $-\epsilon_2$ ($\epsilon_2$>0), while being an increasing function in the definition domain over and above the negative designated value $-\epsilon_2$.

$$w_1(e_1)=0 \text{ (if } e_1 \leq -\epsilon_2\text{), or } w_1(e_1)=(\epsilon_1/\epsilon_2)e_1+\epsilon_1 \text{ (if } -\epsilon_2<e_1\text{)} \quad (102)$$

Figure 6C:
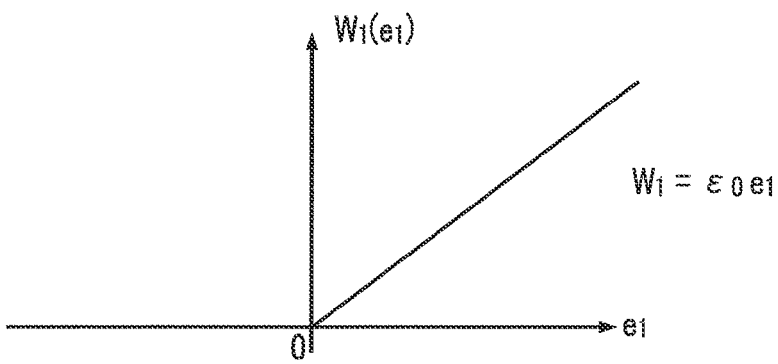
FIG. 6C is an explanatory view related to the third embodiment of the coefficient function.

The first coefficient $w_1(e_1(s))$ may be calculated according to the first coefficient function $w_1(e_1)$ defined by expression (103). This first coefficient function $w_1(e_1)$ is 0 in the definition domain less than 0 while is an increasing function in the definition domain equal to or more than 0 as shown in FIG. 6C.

$$w_1(e_1)=0 \text{ (if } e_1 \leq 0\text{), or } w_1(e_1)=\epsilon_0 e_1, (0<\epsilon_0) \text{ (if } 0<e_1) \quad (103)$$

The first processing element 21 calculates a first cost $E_1$ in accordance with a first cost function $E_1(e_1)$ (which corresponds to "a first cost function" of the present invention) on the basis of the first coefficient $w_1(e_1(s))$ and the first deviation $e_1(s)$ (FIG. 3/STEP12).

The first cost function $E_1(e_1)$ is defined as a product of the first coefficient function $w_1(e_1)$ and the square of the absolute value $|e_1|$ of the first deviation, for example, indicated by expression (110). Therefore, the first cost $E_1$ corresponds to a total of elastic energy of a virtual spring group shown in FIG. 8 which approximates the virtual point to the actual point having the first coefficient $w_1(s)$ as the spring coefficient. Such a number of the power is not limited to "2", but may be set to any positive value such as "0.5", "1.5" or "3".

$$E_1(e_1)=w_1(e_1)|e_1|^2 \quad (110)$$

The first coefficient $w_1$ is calculated according to the first coefficient function $w_1(e_1)$ based on the first deviation $e_1$ (refer to FIG. 3/STEP10), and apart from this, the value of the power (square) of the absolute value $|e_1|$ of the first deviation may be separately calculated, and then such calculation results may be multiplied for the calculation of the first cost $E_1$ (refer to FIG. 3/STEP12). Alternatively, the first cost $E_1$ may be calculated according to the first cost function $E_1(e_1)$ based on the first deviation $e_1$.

The first cost $E_1$ is calculated according to expression (120) showing a sum of the value of the first cost function $E_1(e_1)$ for pixels s belonging to the target region (secondary distance image coordinate system) in the standard image coordinate system. $\Sigma_s$ means a sum of pixels s belonging to the target region (secondary distance image coordinate system) in the standard image coordinate system.

$$E_1=\Sigma_s E_1(e_1(s)) \quad (120)$$

Since the first deviation $e_1(s)$ is a function having the plane parameter $\hat{m}(s)$ of the virtual face as a variable, the first cost $E_1$ calculated based on the first deviation $e_1(s)$ is a function having the plane parameter $\hat{m}(s)$ of the virtual face as the variable.

Figure 7A:
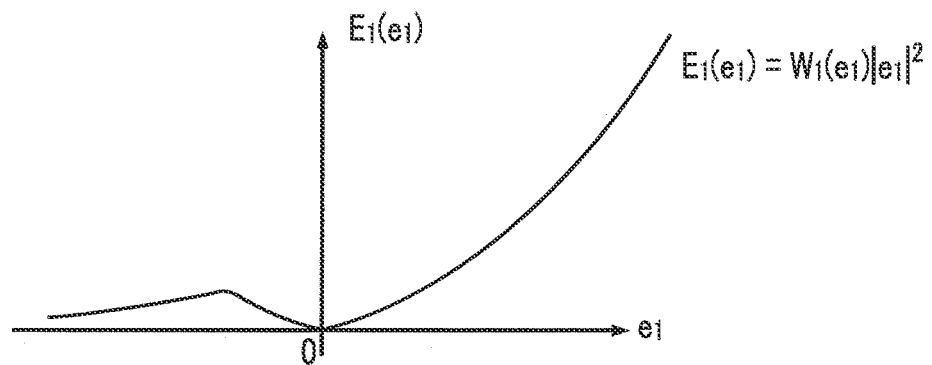
FIG. 7A is an explanatory view related to a first embodiment of a cost function.

In a case where the first coefficient function $w_1(e_1)$ is defined according to expression (101) (refer to FIG. 6A), the first cost function $E_1(e_1)$ has a minimum value 0 at $e_1=0$, and is an increasing function in the positive definition domain ($e_1>0$) as is shown in FIG. 7A. Furthermore, the first cost function $E_1(e_1)$ shows an asymmetric deformation characteristic in the positive and the negative definition domains. That is, a first cost function value $E_1C$ based on a positive variable value $e_1=c$ (>0) becomes larger than a first cost function value $E_1C$ based on a negative variable value −c having the same absolute value.

Figure 7B:
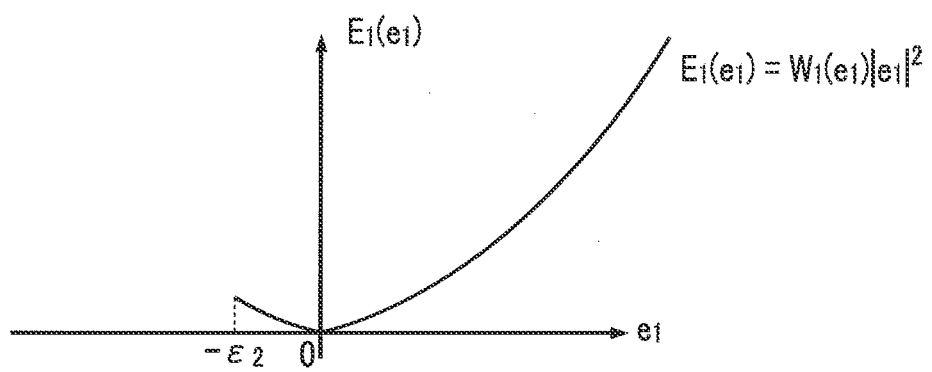
FIG. 7B is an explanatory view related to a second embodiment of the cost function.

In a case where the first coefficient function $w_1(e_1)$ is defined according to expression (102) (refer to FIG. 6B), the first cost function $E_1(e_1)$ has a minimum value 0 at $e_1=0$, and is an increasing function in the positive definition domain as is shown in FIG. 7B. Furthermore, the first cost function E1(e1) shows a symmetric deformation characteristic in the positive and the negative definition domains $-\epsilon_2 < e_1 < \epsilon_2$. The first cost function $E_1(e_1)$ is 0 in a negative definition domain $e_1 \leq -\epsilon_2$ equal to or less than a negative designated value.

Figure 7C:
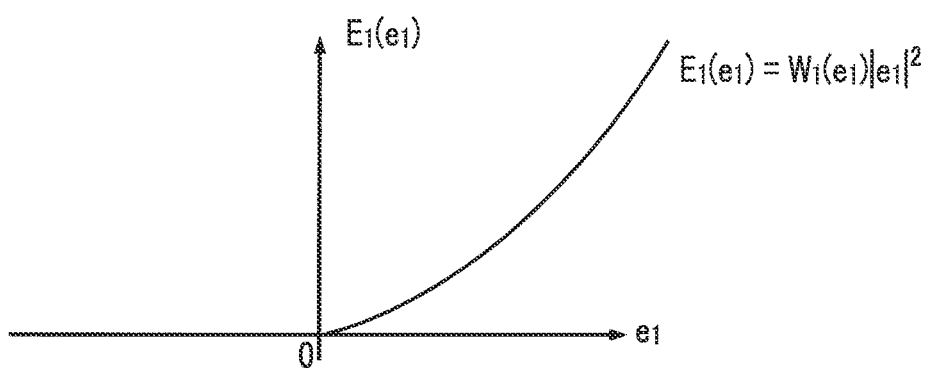
FIG. 7C is an explanatory view related to a third embodiment of the cost function.

In a case where the first coefficient function $w_1(e_1)$ is defined according to expression (103) (refer to FIG. 6C), the first cost function $E_1(e_1)$ is 0 in the negative definition domain and is an increasing function in the positive definition domain as is shown in FIG. 7C.

The second processing element 22 generates a transformed image by a coordinate transformation of the reference image to the standard image coordinate system under the assumption that each of the standard image sensor 11 and the reference image sensor 12 is taking an image of the same virtual face (FIG. 3/STEP14). Particularly, an image allocated with a luminance of a pixel position $S_{ref}$ in a case a parallax according to the position and the posture of the virtual face exists among the reference image coordinate system, with respect to the pixel position s of the standard image coordinate system, is obtained as the transformed image.

The second processing element 22 calculates a second cost $E_2$ in accordance with a second cost function $E_2(e_1, e_2)$ on the basis of a second coefficient $w_2(e_1(s))$ and a second deviation $e_2(s)$ (FIG. 3/STEP16). A deviation of a designated physical quantity which is a pixel value of the same pixel position s in the standard image coordinate system and the transformed image coordinate system, for example, the luminance residual $\Delta I(s)$ is used as the second deviation $e_2(s)$. A physical quantity other than the luminance obtained through the visible light camera such as a color (RGB value) obtained through the visible light camera or a temperature obtained through an infrared light camera or the like may be used as the designated physical quantity.

The second cost function $E_2(e_1, e_2)$ is defined as a product of the second coefficient function $w_2(e_1)$ and the square of the absolute value $|e_2|$ of the second deviation, for example, as shown by expression (210). Therefore, the second cost $E_2$ corresponds to elastic energy of a virtual spring which approximates the virtual point to the actual point having the second coefficient $w_2(e_1)$ as the spring coefficient, and according to the restraint condition that "the designated physical quantity (in this case, luminance) of a same location imaged by each of the standard image sensor 11 and the reference image sensor 12 at the same time, is same". (refer to FIG. 8). That is, the second cost $E_2$ corresponds to a total of elastic energy of the virtual spring group. Such a number of the power is not limited to "2", but may be set to any positive value such as "0.5", "1.5" or "3".

$$E_2(e_1, e_2)=w_2(e_1)|e_2|^2 \quad (210)$$

The second coefficient $w_2$ is calculated according to the second coefficient function $w_2(e_1)$ based on the first deviation $e_1$ (refer to FIG. 3/STEP10), and apart from this, the value of the power (square) of the absolute value $|e_2|$ of the second deviation is separately calculated, and then such calculation results are multiplied for the calculation of the second cost $E_2$ (refer to FIG. 3/STEP16). Alternatively, the second cost $E_2$ may be calculated according to the second cost function $E_2(e_1, e_2)$ based on the first deviation $e_1$ and the second deviation $e_2$.

The second cost $E_2$ is calculated according to expression (220) showing a sum total of the value of the second cost function $E_2(e_1, e_2)$ for pixels s belonging to the target region (secondary distance image coordinate system) in the standard image coordinate system.

$$E_2=\Sigma_s E_2(c_1(s), c_2(s)) \quad (220)$$

Similar to the first deviation $e_1(s)$, since the second deviation $e_2(s)$ is a function having the plane parameter $\hat{m}(s)$ of the virtual face as a variable, the second cost $E_2$ calculated based on the first deviation $e_1(s)$ and the second deviation $e_2(s)$ is a function having the plane parameter ^m(s) of the virtual face as the variable.

The second coefficient function $w_2(e_1)$ may be the same as the first coefficient function $w_1(e_1)$, or may be different. For example, both of the first coefficient function $w_1(e_1)$ and the second coefficient function $w_2(e_1)$ may be defined according to expression (101). The first coefficient function $w_1(e_1)$ may be defined according to expression (101), while the second coefficient function $w_2(e_1)$ may be defined according to expression (102). The second deviation $e_2$ may be used as the main variable of the second coefficient function $w_2$ instead of the first deviation $e_1$.

The luminance residual $\Delta I(s)$ is obtained according to the aforementioned restrain condition. For the sake of ease, a case in which the standard image sensor 11 and the reference image sensor 12 are parallel stereo type having the same internal parameters and are arranged so that the optical axes thereof are parallel to each other.

Figure 9A:
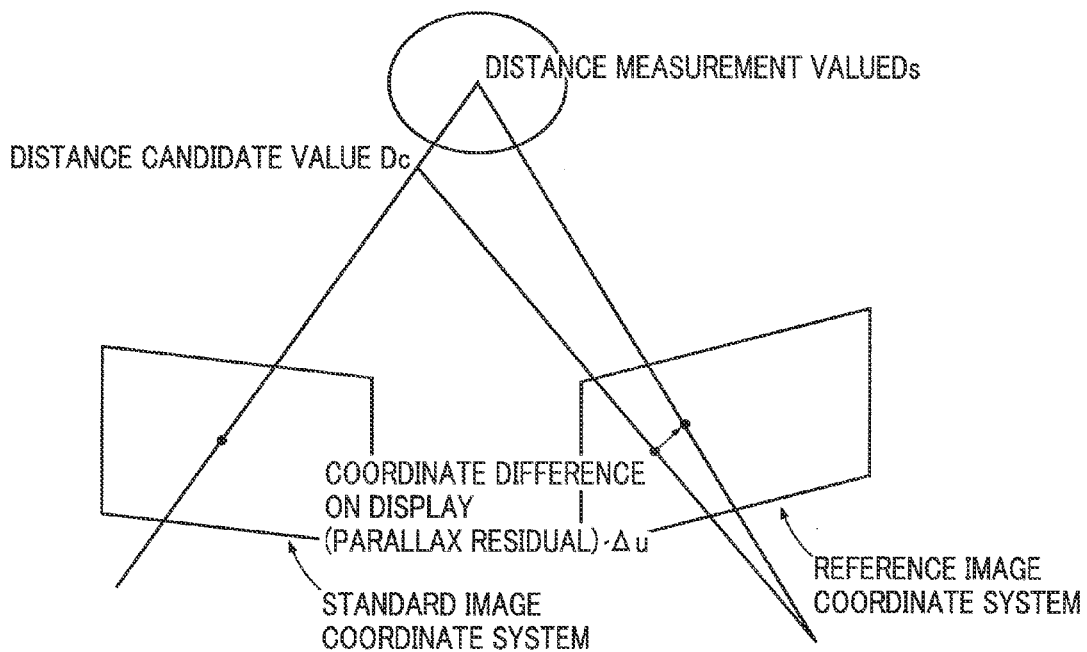
FIG. 9A is an explanatory view related to a distance residual.

In a case the standard image sensor 11 and the reference image sensor 12 are not in a parallel stereo relation, as is shown in FIG. 9A, the parallax residual $\Delta u$ is an interval of the pixel position as a result of projecting each of the distance measurement value Ds(s) and a distance candidate value Dc(s) to the reference image sensor 12. The parallax residual $\Delta u$ is defined according to expression (201) based on an actual point distance Zs, a virtual point distance Zc, and a base line length L of both image sensors 11 and 12 (refer to FIG. 5).

$$\Delta u = L\{(1/Zs) - (1/Zc)\} \qquad (201)$$

Figure 9B:
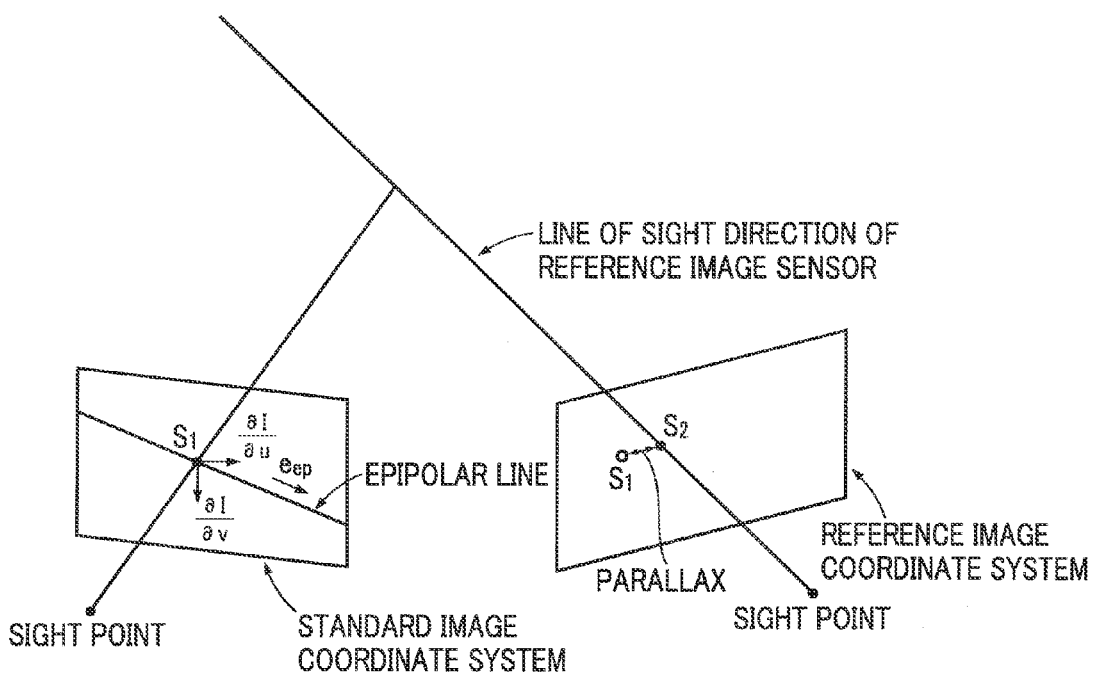
FIG. 9B is an explanatory view related to epipolar restraint condition.
Figure 10A:
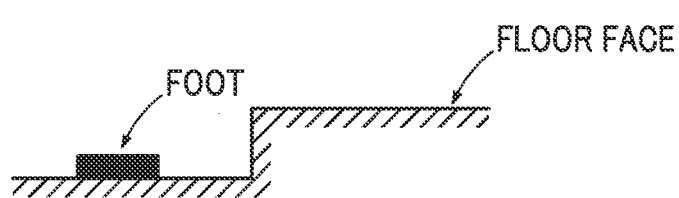
FIG. 10A is an explanatory view of a first example of an estimation result of a contact state of a foot rear surface and a floor surface according to a first embodiment.
Figure 10B:
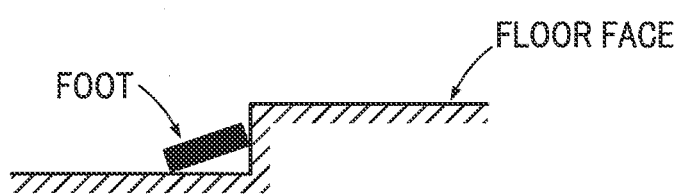
FIG. 10B is an explanatory view of a second example of the estimation result of the contact state of the foot rear surface and the floor surface according to the first embodiment.
Figure 10C:
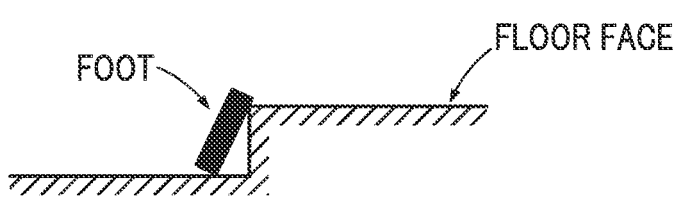
FIG. 10C is an explanatory view of a third example of the estimation result of the contact state of the foot rear surface and the floor surface according to the first embodiment.
Figure 10D:
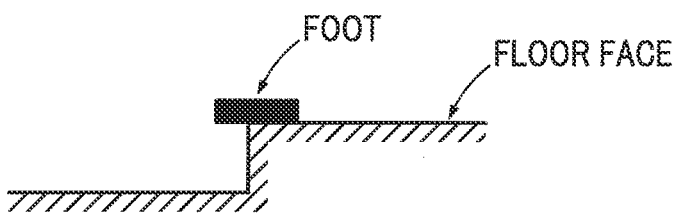
FIG. 10D is an explanatory view of a fourth example of the estimation result of the contact state of the foot rear surface and the floor surface according to the first embodiment.
Figure 11A:
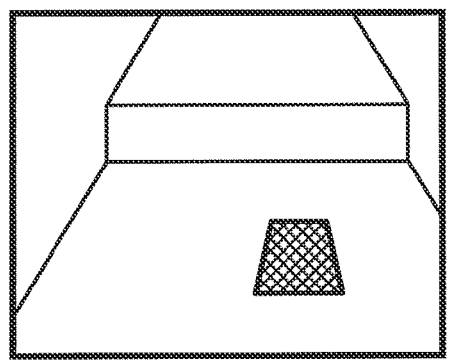
FIG. 11A is an explanatory view of the first example of an estimation result of the contact state of the foot rear surface and the floor surface in a standard image coordinate system according to the first embodiment.
Figure 11B:
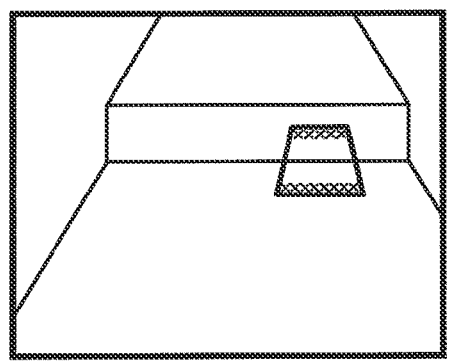
FIG. 11B is an explanatory view of the second example of the estimation result of the contact state of the foot rear surface and the floor surface in the standard image coordinate system according to the first embodiment.
Figure 11C:
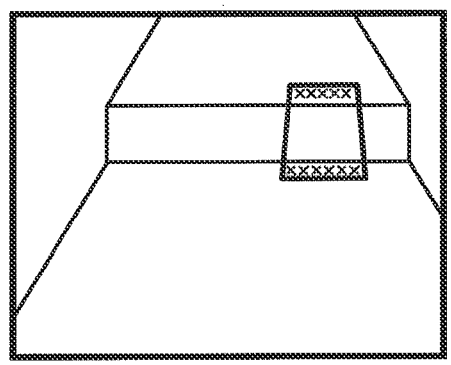
FIG. 11C is an explanatory view of the third example of the estimation result of the contact state of the foot rear surface and the floor surface in the standard image coordinate system according to the first embodiment.
Figure 11D:
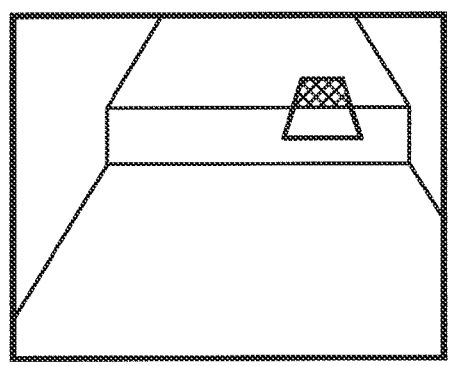
FIG. 11D is an explanatory view of the fourth example of the estimation result of the contact state of the foot rear surface and the floor surface in the standard image coordinate system according to the first embodiment.

"u" is a coordinate value expressing a position in the lateral direction in the standard image coordinate system (or the reference image coordinate system). In a case of a parallel stereo, the direction of the u axis is parallel to an epipolar line. The luminance residual $\Delta I$ of the standard image and the reference image under the assumption that a parallax residual $\Delta u$ exists, is expressed by the expression (202) taking into consideration an epipolar restrain condition (refer to FIG. 9B).

$$\Delta I = (\partial I/\partial u) \hat{c}_{ep} \hat{} \Delta u \qquad (202)$$

$\hat{e}_{ep}$ is a unit vector denoting the epipolar line direction in the standard image coordinate system. $(\partial I/\partial u)$ is a vector denoting a luminance gradient. Especially in a case of a parallel stereo, the luminance gradient only in the u axis direction is effective.

The expression (212) shows that the parallax residual $\Delta u(s)$ is converted to luminance residual $\Delta I(s)$ according to the restraint condition. The parallax residual $\Delta u(s)$ is an interval between a position as a result of projecting pixel s of the standard image coordinate system (secondary distance coordinate system) to the reference image coordinate system according to the distance measurement value Ds and a position as a result of projecting pixel s of the standard image coordinate system to the reference image coordinate system according to the distance candidate value Dc.

Instead of the luminance residual $\Delta I(s)$, the parallax residual $\Delta u$ calculated by converting the luminance residual $\Delta I(s)$ according to expression (202) or the distance residual $\Delta Z(s)$ calculated by converting the luminance residual $\Delta I(s)$ according to expressions (202) (203) may be used as the second deviation $e_2(s)$. Expression (203) is obtained by transforming expression (201) according to expressions $\Delta u = (du/dZc) \Delta Z$ and $\Delta Z = Zs - Zc$.

$$\Delta u(s) = -(L/Zc^2) \Delta Z(s) \qquad (203)$$

The luminance residual $\Delta I(s)$ in a case distance residual $\Delta Z(s) = Zs(s) - Zc(s)$ exists may be calculated according to expressions (202) and (203).

The third processing element 23 calculates a linear sum of the first cost $E_1$ and the second cost $E_2$ expressed by expression (301) or (302) as a total cost E. As described above, since both of the first cost $E_1$ and the second cost $E_2$ are functions having the plane parameter ^m of the virtual face as the variable, the total cost E is also defined as a function E(^m) of the plane parameter ^m.

$$E(\hat{}m) = E_1(\hat{}m) + E_2(\hat{}m) \qquad (301)_c$$

$$E(\hat{}m) = \chi E_1(\hat{}m) + (1-\chi) E_2(\hat{}m), (0 < \chi < 1) \qquad (302)$$

Then, the third processing element 23 searches for a plane parameter ^m which makes the total cost E to be the minimum value according to a least-square method or a gradient method which sequentially changes the plane parameter of the virtual face for an amount according to $(\partial E(\hat{}m)/\partial \hat{}m)$ (FIG. 3/STEP18). By this, the position and the posture of the virtual face (foot rear face) are estimated.

According to whether or not the plane parameter ^q satisfies a certain convergence condition such as a difference between a previous value and a current value of the total cost E is equal to or less than a threshold value or the like, it is determined whether or not the search of the virtual face is terminated (FIG. 3/STEP 20). In a case where the determination result is negative (FIG. 3/STEP 20 . . . NO), a current plane parameter ^m (k+1) as a result of updating a previous plane parameter ^m(k) (k denotes an index expressing the number of times of updating the plane parameter) according to the gradient method, is set (FIG. 3/STEP08). And then, the aforementioned sequence of processing is repeated (FIG. 3/STEP 10 to STEP 20).

On the other hand, in a case the determination result is positive (FIG. 3/STEP 20 . . . YES), the third processing element 23 estimates the position and posture of the virtual face defined by the plane parameter ^m at that time point as a position and a posture of the foot rear face or a contact face of the foot rear face and the floor face (FIG. 3/STEP22).

According to this, for example, a state in which the foot sole rear face is contacting the floor face as shown in each of FIG. 10A to FIG. 10D is estimated as the contact state of the foot rear face and the floor face in the future. FIG. 11A to FIG. 11D show distance images expressing the contact states (grid lines are drawn for the contacting portions) which are shown in FIG. 10A to FIG. 10D.

(Effects)

According to the contact state estimating apparatus and method of the present invention, the first deviation $e_1(s)$ is defined so as the magnitude thereof is determined according to the magnitude of the distance residual $|Zc(s)-Zs(s)|$ between the actual point Pc and the virtual point Ps (refer to FIG. 5). The first deviation $e_1$ is a positive value in a case where the virtual point Pc is positioned farther than the actual point Ps with reference to the standard image sensor 11, while, in contrast, is a negative value in a case where the virtual point Pc is positioned nearer than the actual point Ps (refer to FIG. 6).

The second deviation $e_2$ is defined so as the magnitude thereof is determined according to the magnitude of the luminance residual (difference of the designated physical quantity) between the pixel s of the standard image and the pixel of the reference image corresponding to the pixel s of the standard image in a form according to the position and the posture of the virtual face provisionally set (refer to FIG. 9A).

The first cost function (the first cost function) $E_1(e_1)$ is defined as a dependent variable which shows a smallest value or a minimum value in a case where the value of the main variable $e_1$ is 0, and which becomes an increasing function in the positive definition domain (refer to expression (110) and FIG. 7A to FIG. 7C). The second cost function (the second cost function) $E_2(e_1, e_2)$ is defined as a function which shows a smallest value or a minimum value in a case where the value of the main variable $e_2$ is 0, and as a function which becomes an increasing function in the positive domain (refer to expression (210) and FIG. 7A to FIG. 7C).

Figure 8:
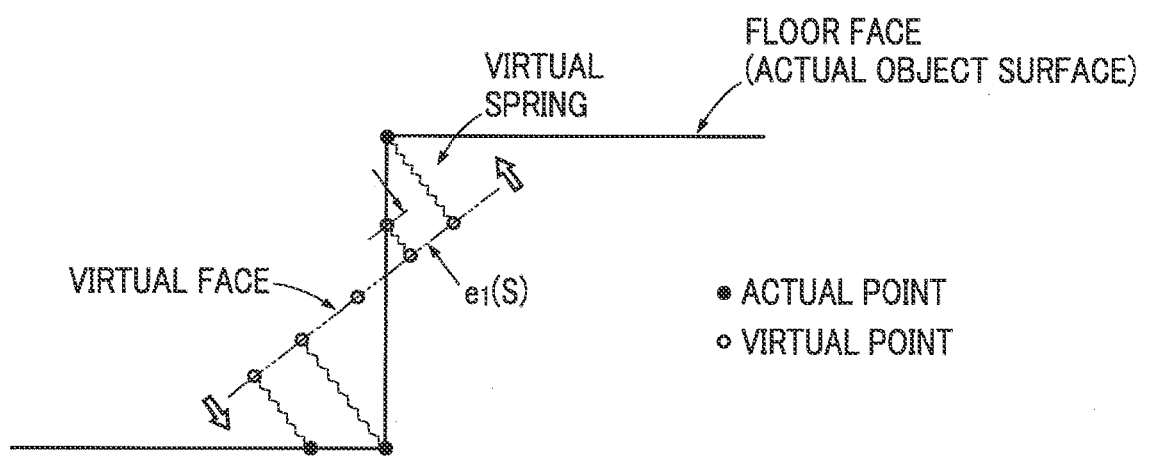
FIG. 8 is an explanatory view related to a virtual spring.

The first cost $E_1(e_1)$ corresponds to the total of elastic energy, having the first deviation $e_1(s)$ as the deformation amount, of a virtual spring group having the value of the first coefficient function $w_1(s)$ in each pixel s included in the target region (secondary distance image) of the standard image (one of the images) as the spring coefficient (refer to FIG. 8). Similarly, the second cost $E_2(e_2)$ corresponds to a total of elastic energy, having the second deviation $e_2$ (or the distance residual $\Delta Z$ obtained according to the restraint condition based on the second deviation $e_2$) as the deformation amount, of the virtual spring group having the value of the second coefficient function $w_2(s)$ in each pixel included in the target region of the standard image as the spring coefficient (refer to FIG. 8).

In a case where a state that at least a part of the virtual object enters into the actual object is set, the first deviation $e_1(s)$ of the pixel s of a part of or all of the target region of the standard image becomes a positive value, and the second deviation $e_2(s)$ becomes a positive or a negative value, and not 0. Therefore, as a virtual point is at a deeper location inside and away from the surface of the actual object according to this setting, the first cost $E_1$ and the second cost $E_2$ are evaluated higher, and the total cost E is also evaluated higher.

Accordingly, by searching the position and the posture of the virtual face so as to enable to approximate the total cost E to the smallest value or the minimum value, the position and the posture of the virtual face that all of the virtual points group on the virtual face is not inside the actual object and at least a part of the virtual points group is positioned on the surface of the actual object can be estimated as the contact state of the virtual face with respect to the surface of the actual object (refer to FIG. 10 and FIG. 11).

Accordingly, a situation of an infeasible state, where a common real space is occupied at the same time by each of the actual object (floor) which is the imaging target and other actual object (foot) corresponding to the virtual object, being searched as the contact state of the two actual objects can be surely avoided (refer to FIG. 8). Further, the future contact state of the surface of the other actual object (foot rear face) with respect to the surface of one actual object (floor) can be estimated precisely.

The first coefficient function $w_1(e_1)$ is defined so that even if the absolute value of the main variable $e_1$ is same, the value in the case where the main variable $e_1$ is a positive value is larger than in the case where the main variable $e_1$ is a negative value (refer to expressions (101) to (103) and FIG. 6A to FIG. 6C). The second coefficient function $w_2(e_1)$ is defined so that even if the absolute value of the main variable $e_1$ is same, the value in the case where the main variable $e_1$ is a positive value is larger than in the case where the main variable $e_1$ is a negative value.

According to this, the first cost $E_1$ is calculated according to the first cost function $E_1(e_1)$ which is asymmetric in the positive and negative definition domains, and the second cost $E_2$ is calculated according to the first cost function $E_1(e_1)$ which is asymmetric in the positive and negative definition domains (refer to FIG. 7A to FIG. 7C). The value of the first coefficient function $w_1(e_1)$ and the second coefficient function $w_2(e_1)$ corresponds to the spring coefficient of the virtual spring.

Therefore, the position and the posture of the virtual face can be searched in a form of giving priority to bring the virtual point located inside the actual object closer to the surface of the actual object than to bring the virtual point located outside the actual object closer to the surface of the actual object. Thereby a situation of an infeasible state where a common real space is occupied at the same time by each of one actual object which is the imaging target and other actual object corresponding to the virtual object is searched as the contact state of the two objects can be surely avoided. Further, a future contact state of the surface of the other actual object with respect to the surface of the one actual object can be estimated precisely.

One of or both of the first coefficient function $w_1(e_1)$ and the second coefficient function $w_2(e_1)$ is defined as an increasing function at least in the positive definition domain. According to this, the spring coefficient of the virtual spring becomes a larger value as the deformation amount of the spring is larger. Therefore, as a certain virtual point is positioned at a deeper location inside and away from the surface of the actual object according to the setting of the position and the posture of the virtual face, both of the first cost $E_1$ and the second cost $E_2$ corresponding to the elastic energy of the virtual spring is evaluated higher, and the total cost E is also evaluated higher.

Therefore, it is able to search the position and the posture of the virtual face so as to approximate the virtual point located inside the actual object to the surface of the actual object faster or stronger. By this, a future contact state of the other actual object with respect to the one actual object can be estimated precisely and at a high speed.

One of or both of the first coefficient function $w_1(e_1)$ and the second coefficient function $w_2(e_1)$ is/are defined as a function which is 0 in the negative definition domain or the definition domain less than the negative designated value (refer to expressions (102) (103), FIG. 6B and FIG. 6C). In such case, the cost of the virtual point outside the actual object or the virtual point which is away from the surface of the actual object to some extent is uniformly evaluated as "0" (refer to FIG. 7B and FIG. 7C). By this, the calculation load required for searching processing of a combination of coordinate values of virtual points that brings the total cost E closer to the smallest value or the minimum value can be reduced.

Second Embodiment of the Present Invention

As is shown in FIG. 12, in a case where a descent level difference portion exists in a walking path of the robot, in some cases occlusion is generated in which a part of the lower level portion becomes a blind area by the level difference portion for each of a range image sensor 10, a standard image sensor 11, and the reference image sensor 12. In order to reduce or eliminate the influence of such occlusion, a three-dimensional mask or extrapolation interpolation processing according to need, is used.

Figure 13:
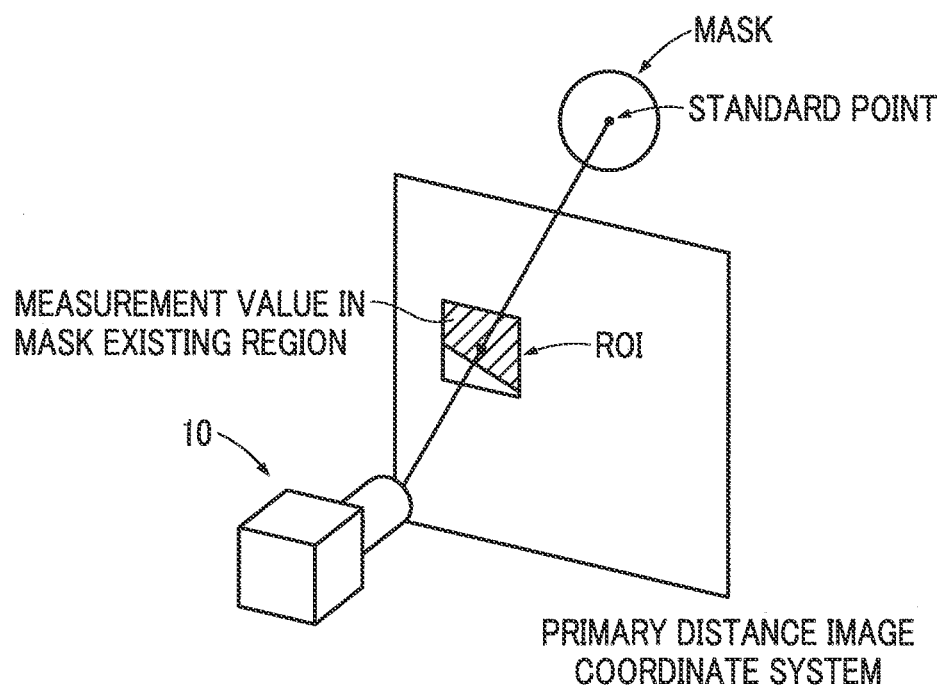
FIG. 13 is an explanatory view related to a method of setting the mask.

Specifically, an actual point which gives a pixel value Ds of a representative point of a center or a gravity center or the like of ROI which is a part of a primarily distance image coordinate system shown in FIG. 13, or a corresponding virtual point is defined as a standard point (refer to FIG. 5).

Figure 14A:
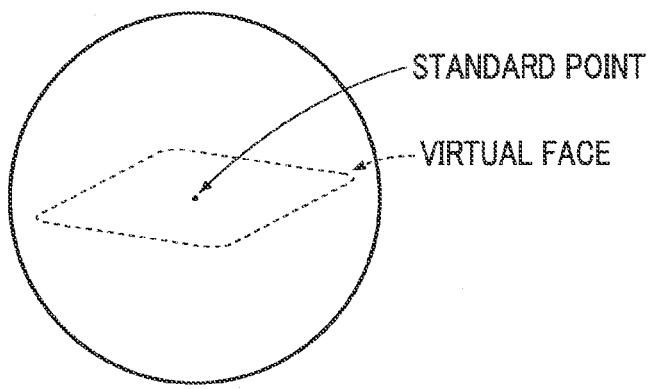
FIG. 14A is an explanatory view related to a first embodiment of the mask.
Figure 14B:
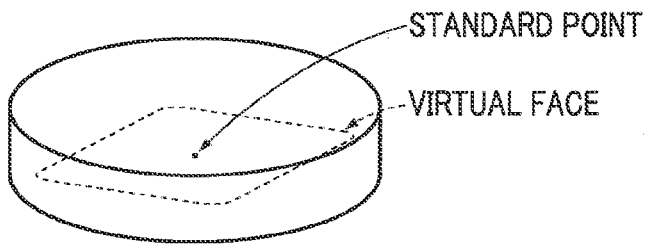
FIG. 14B is an explanatory view related to a second embodiment of the mask.
Figure 14C:
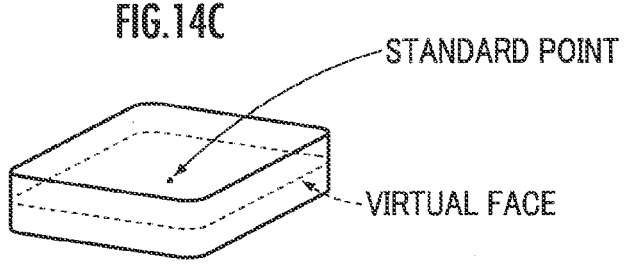
FIG. 14C is an explanatory view related to a third embodiment of the mask.

Then, a virtual face is set so that a position of the representative point such as the center or the gravity center or the like of the virtual face coincides with a position of the standard point, and a solid encompassing the virtual face is defined as the mask. As is shown in FIG. 14A, there is defined a spherical mask with the standard point as the center and encompassing a virtual face having a substantially rectangular shaped contour (refer to the dashed line) which corresponds to the foot rear face in the real space. The shape of the mask may be a substantially cylindrical shape or a disk shape as is shown in FIG. 14B, or may be a substantially rectangular cylindrical shape or a rectangular plate shape as is shown in FIG. 14C.

As is shown in FIG. 12, among each of a plurality of actual points (refer to ●) having a distance measurement value (pixel value) Ds in the ROI, only those encompassed in the mask in the real space are selected. In FIG. 13, a region corresponding to actual points having a distance measurement value and encompassed in the mask in the ROI is shown with a slashed line.

Figure 15A:
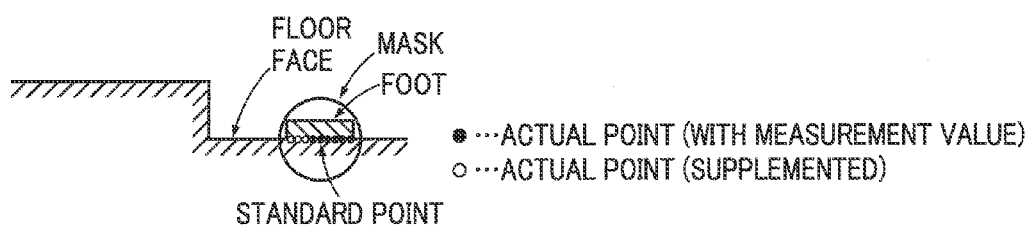
FIG. 15A is an explanatory view of a first example of an estimation result of a contact state of a foot rear surface and a floor surface according to the second embodiment.
Figure 15B:
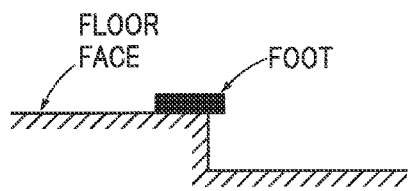
FIG. 15B is an explanatory view of a second example of the estimation result of the contact state of the foot rear surface and the floor surface according to the second embodiment.
Figure 15C:
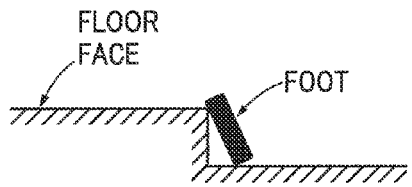
FIG. 15C is an explanatory view of a third example of the estimation result of the contact state of the foot rear surface and the floor surface according to the second embodiment.
Figure 16A:
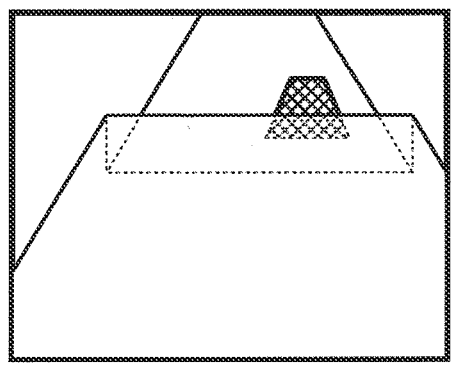
FIG. 16A is an explanatory view of the first example of an estimation result of the contact state of the foot rear surface and the floor surface in a standard image coordinate system according to the second embodiment.
Figure 16B:
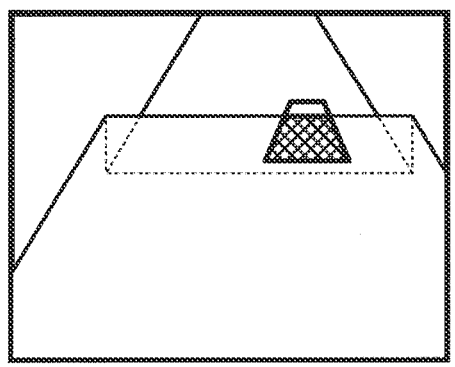
FIG. 16B is an explanatory view of the second example of the estimation result of the contact state of the foot rear surface and the floor surface in the standard image coordinate system according to the second embodiment.
Figure 16C:
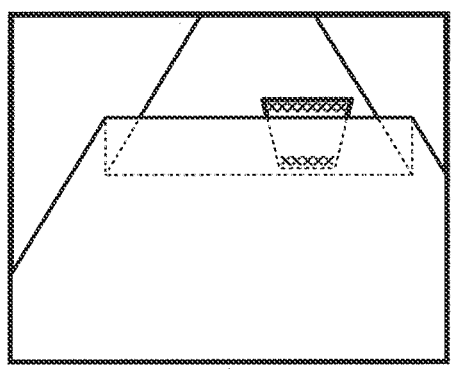
FIG. 16C is an explanatory view of the third example of the estimation result of the contact state of the foot rear surface and the floor surface in the standard image coordinate system according to the second embodiment.

Then, according to the extrapolation interpolation processing, actual points (refer to ○) in the other region encompassed in the mask is supplemented. As a result, even if the standard point exists in the lower level portion and an occlusion derived from the level difference in the proximity of the standard point is generated, a contact state of the foot rear face and the floor face can be estimated with high accuracy (refer to FIG. 15A and FIG. 16A). In other words, according to the necessity of executing extrapolation interpolation processing, whether or not an occlusion is generated can be determined. In a case the standard point exists in an upper level portion, similar to the aforementioned embodiment, the contact state of the foot rear face and the floor face is estimated with high accuracy (refer to FIG. 15B, FIG. 15C, FIG. 16B, and FIG. 16C). Furthermore, among the plurality of actual points having the pixel value Ds, only those encompassed in the mask are selected, thereby enabling to exclude actual points having pixel value Ds with a large measuring errors and to estimate the contact state of the foot rear face and the floor face with high accuracy.

The first coefficient function $w_1(e_1)$ defined by expression (102) (refer to FIG. 6B), may be not 0 but a positive designated value in a definition domain equal to or less than a negative designated value $-\epsilon_2(c_2>0)$. In such case, a cost E of a virtual point that is located outside the actual object and is away from the surface of the actual object to some extent is uniformly estimated as "a positive designated value". Thereby, even when the surface of the virtual object is away from the surface of one actual object, searching processing for a virtual face so as to bring the total cost E closer to the smallest value or the minimum value can be promoted. As a result, a future contact state between the one actual object and the other actual object can be estimated precisely and promptly.

Further, a plurality of combinations of a standard position and a standard posture of the foot rear face and a plane parameter or a curved face parameter may be assumed, and in accordance with each of the combinations, a plurality of future contact states between the actual object and the other actual object corresponding to the virtual object may be estimated.

What is claimed is:

1. A contact state estimating apparatus configured to estimate a contact state between a surface of an actual object and a virtual face which is a surface of a virtual object having a designated shape, by using a pair of image sensors configured to acquire each of a pair of images composed of a plurality of pixels having a designated physical quantity as a pixel value by imaging the actual object, and a range image sensor configured to measure distance up to the actual object and to allocate the measured distance with respect to each of a plurality of pixels composing a target region of one of the images obtained by one of the image sensors among the pair of image sensors, comprising:

a first processing element configured to calculate a sum of a value of a first cost function having a first deviation allocated to each pixel in the target region as a main variable, as a first cost;

a second processing element configured to calculate a sum of a value of a second cost function having a second deviation allocated to each pixel in the target region or both of the first deviation and the second deviation as a main variable, as a second cost; and a third processing element configured to search for a position and a posture of the virtual face in a case of contacting the surface of the actual object so as to approximate a total cost of the first cost and the second cost to a smallest value or a minimum value, wherein the first deviation is defined as a variable such that a magnitude of an absolute value is determined according to a length of an interval between an actual point whose position is determined by a distance to the actual object obtained by the range image sensor and a virtual point which is a result of projecting the actual point to the virtual face in a line of sight direction of the one of the image sensors, and being a positive value in a case where the virtual point is positioned farther than the actual point with reference to the one of the image sensors, while being a negative value in a case where the virtual point is positioned nearer than the actual point with reference to the one of the image sensors, wherein the second deviation is defined as a variable such that a magnitude is determined according to a magnitude of a difference between the designated physical quantity possessed by the pixels of the one of the images obtained by the one of the image sensors among the pair of image sensors and the designated physical quantity possessed by the pixels of the other image obtained by the other image sensor among the pair of image sensors corresponding to the pixels of the one of the images in a form according to the position and the posture of the virtual face, wherein each of the first cost function and the second cost function is defined as a function which shows a smallest value or a minimum value in a case where a value of the main variable is 0 and which is an increasing function in a positive definition domain, and wherein the first cost function is defined by a product between a positive exponentiation of an absolute value of the first deviation, and a first coefficient function being a function having the first deviation as the main variable and a range of value being 0 or more and a value in the positive definition domain being larger than a value in a negative definition domain even in a case where absolute values thereof are same.

2. The contact state estimating apparatus according to claim 1, wherein the second cost function is defined by a product between a positive exponentiation of an absolute value of the second deviation, and a second coefficient function being a function having the first deviation or the second deviation as the main variable and a range of value being 0 or more, and a value in the positive definition domain being larger than a value in the negative definition domain even in a case where absolute values thereof are same.

3. The contact state estimating apparatus according to claim 2, wherein one or both of the first and the second coefficient functions is defined as an increasing function at least in the positive definition domain.

4. The contact state estimating apparatus according to claim 3, wherein one or both of the first and the second coefficient functions is defined as a function which is 0 in the negative definition domain or a definition domain less than a negative designated value.

5. The contact state estimating apparatus according to claim 2, wherein the second deviation as the main variable of the second coefficient function is defined as a parallax residual of the pair of image sensors as a result of a difference of the designated physical quantity imaged by each of the pair of image sensors being converted, according to a restraint condition that the designated physical quantity of a same part in a real space are same, or defined as a distance residual corresponding to the parallax residual.

6. The contact state estimating apparatus according to claim 1, wherein the range image sensor is configured so as to obtain a distance image composed of a plurality of pixels having a distance to the actual object as a pixel value, and
wherein the first processing element is configured to allocate a distance according to the pixel value of each pixel composing the distance image as a pixel value with respect to the plurality of pixels composing the target region of the one of the images, according to a relative arrangement relation of the one of the image sensors and the range image sensor.

7. The contact state estimating apparatus according to claim 3, wherein one or both of the first and the second coefficient functions is defined as a function which is a positive designated value in the negative definition domain or a definition domain less than a negative designated value.

8. The contact state estimating apparatus according to claim 1, wherein the first processing element determines a standard point in a region where the target region is projected to the surface of the virtual object, selects an actual point within a predetermined range from the standard point or an actual point corresponding to the standard point, and determines the first deviation.

9. A contact state estimating method for estimating a contact state between a surface of an actual object and a virtual face which is a surface of a virtual object having a designated shape, comprising:
a step for acquiring each of a pair of images composed of a plurality of pixels having a designated physical quantity as a pixel value by imaging the actual object using a pair of image sensors;
a step for measuring a distance up to the actual object allocated with respect to each of a plurality of pixels composing a target region of one of the images acquired by one of the image sensors among the pair of image sensors using a range image sensor;
a first step for calculating a sum of a first cost function having a first deviation allocated to each pixel in the target region as a main variable, as a first cost;
a second step for calculating a sum of a second cost function having a second deviation allocated to each pixel in the target region or both of the first deviation and the second deviation as a main variable, as a second cost; and
a third step for searching a position and a posture of the virtual face in a case of contacting the surface of the actual object so as to approximate a total cost of the first cost and the second cost to a smallest value or a minimum value,
wherein the first deviation is defined as a variable such that a magnitude of an absolute value is determined according to a length of an interval between an actual point whose position is determined by a distance to the actual object obtained by the range image sensor and a virtual point which is a result of projecting the actual point to the virtual face in a line of sight direction of the one of the image sensors, and being a positive value in a case where the virtual point is positioned farther than the actual point with reference to the one of the image sensors, while being a negative value in a case where the virtual point is positioned nearer than the actual point with reference to the one of the image sensors,
wherein the second deviation is defined as a variable such that a magnitude is determined according to a magnitude of a difference between the designated physical quantity possessed by the pixels of the one of the images obtained by the one of the image sensors among the pair of image sensors and the designated physical quantity possessed by the pixels of the other image obtained by the other image sensor among the pair of image sensors corresponding to the pixels of the one of the images in a form according to the position and the posture of the virtual face, and
wherein each of the first cost function and the second cost function is defined as a function which shows a smallest value or a minimum value in a case where a value of the main variable is 0 and which is an increasing function in a positive definition domain,
wherein the first cost function is defined by a product between a positive exponentiation of an absolute value of the first deviation, and a first coefficient function being a function having the first deviation as the main variable and a ranqe of value being 0 or more and a value in the positive definition domain being larger than a value in a negative definition domain even in a case where absolute values thereof are same.

* * * * *